Nov. 2, 1937. J. D. MORGAN 2,098,058
APPARATUS FOR LOCATING TOP DEAD CENTERS
Original Filed Aug. 15, 1933
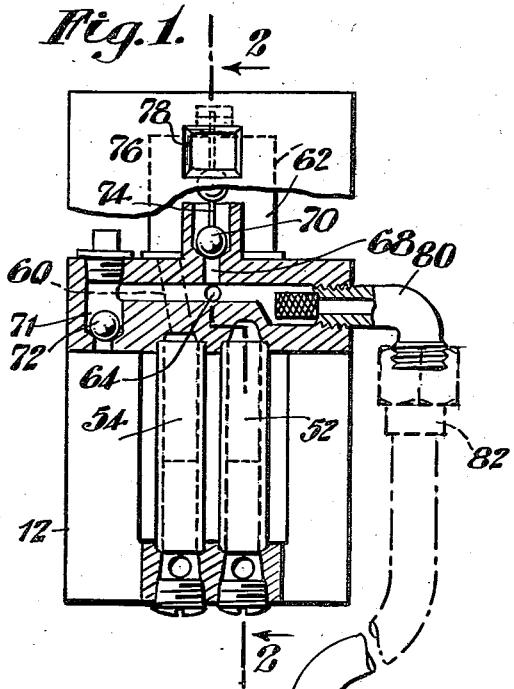
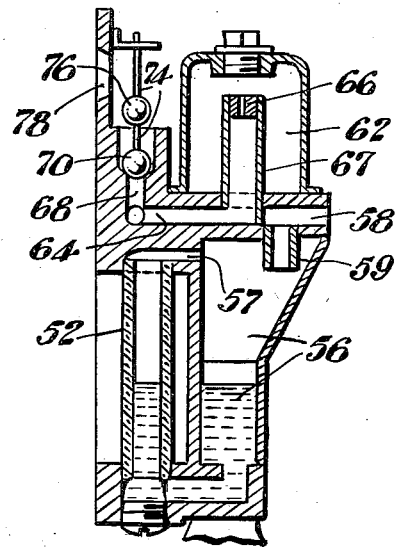
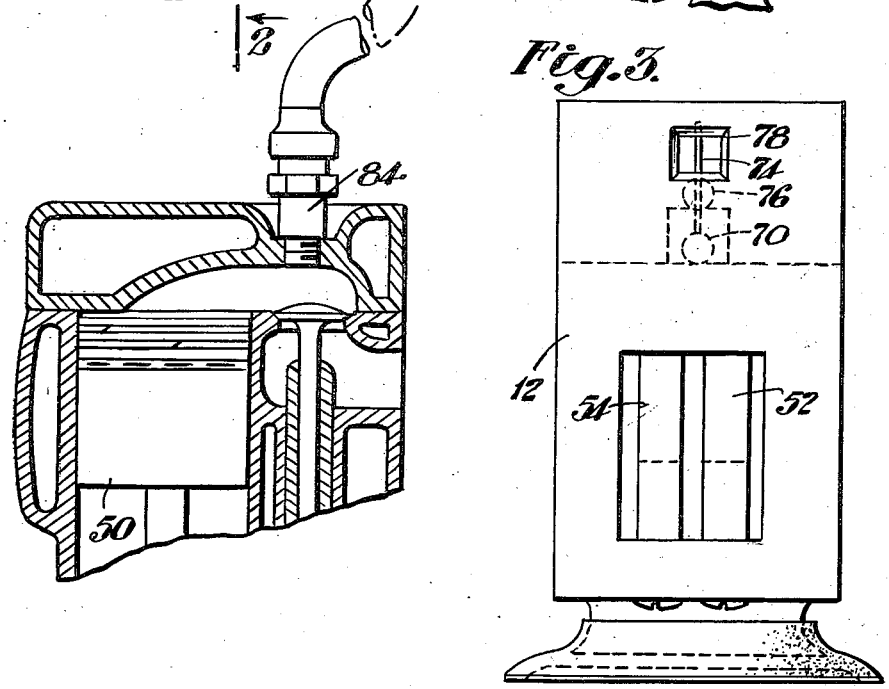
INVENTOR
JOHN D. MORGAN
BY
ATTORNEY Patented Nov. 2, 1937

2,098,058

UNITED STATES PATENT OFFICE 2,098,058

APPARATUS FOR LOCATING TOP DEAD CENTER

John D. Morgan, South Orange, N. J., assignor, by mesne assignments, to Power Patents Company, Jersey City, N. J., a corporation of Maine Original application August 15, 1933, Serial No. 685,219. Divided and this application February 19, 1936, Serial No. 64,792

4 Claims. (Cl. 73—51)

This invention relates to adjustment of the timing of an ignition system of an automotive internal combustion engine, and more particularly concerns an improved top dead center indicating gauge adapted for accurately locating the top dead center position of a piston in an automotive engine cylinder. This application is a division of my copending application Serial No. 685,219, patented June 9, 1936, as United States Patent No. 2,043,931 for Motor timing method and apparatus.

Correct ignition timing of an internal combustion engine is a factor of major importance in the attainment not only of maximum speed and power, but also of maximum economy and efficiency of operation. The factor of correct ignition timing is even more important than the factor of correct proportioning of the fuel and air supplied to the engine from the carbureter, as is shown by the fact that the engine is more sensitive to adjustments of ignition timing than it is to any other adjustment. With a properly timed ignition system almost any internal combustion engine, even one designed for operation at a high compression ratio, can be made to operate satisfactorily without spark knock when using ordinary straight run gasoline as fuel.

The primary object of the present invention is to provide improved method and means whereby even an unskilled operator may rapidly and accurately check and adjust the ignition timing of an automotive engine.

In checking the ignition timing of an automotive engine cylinder, a very important step is that of locating the top dead center position of the piston in the cylinder at the end of its compression stroke within an allowable tolerance of .001 of an inch of piston travel. This is because the ignition is timed with reference to the top dead center position of the piston. Moreover it is desirable to carry out the ignition timing operation rapidly and without removing the cylinder head or otherwise seriously disrupting the normal operating condition of the engine.

Methods and instruments heretofore developed for checking ignition timing and for locating the top dead center position of automotive engines are in general relatively complicated, inconvenient, time-consuming and inaccurate, particularly in the hands of an unskilled operator. One method heretofore employed for locating the top dead center position of an engine piston has been by inserting a wire or other displacement member into the ignition space of a cylinder through a priming cock or through an open spark plug socket, with the lower end of the wire resting on the top of the cylinder, and then hand cranking the engine until the wire is raised by the piston to its apparent highest point. This method is difficult in application and subject to considerable error because of uneven carbon deposit on the piston head, and because most modern engines are not fitted with priming cocks; and in many engines, as for example those of the L head type, spark plug sockets are offset to one side of the cylinder or are so relatively small as to make it difficult and sometimes impossible to use the ordinary type of displacement gauge for locating top dead center position.

Another method heretofore employed for ignition timing has involved hand cranking of the engine until the piston in a reference cylinder (usually No. 1 cylinder) is at the top dead center position of the compression stroke, as indicated by a mark such as "D. C. 1-4" placed by the manufacturer on the engine fly-wheel. Many modern automobiles, however, have no facilities for hand cranking and/or have inaccessible or unmarked fly-wheels.

Another object of the present invention is to provide mechanism whereby even an unskilled operator can quickly locate the top dead center position of a piston at the end of its compression stroke within a limit of accuracy under .001 of an inch of piston travel.

Calculations and check tests on the clearance or ignition space of a common type of four-cycle engine cylinder between the piston head and spark plug opening show that each .001 of an inch of piston travel toward or away from its top dead center position respectively results in an increase or drop in pressure of less than ½ inch water pressure starting from atmospheric pressure. The top dead center indicating gauge forming part of the subject-matter of the present invention, in its preferred form, is accordingly featured by embodying as an element a special modified form of double U-tube manometer with calibrated orifice and pressure and relief valve fittings adapting the gauge for accurate and reliable indications of pressure changes within a range of less than ½ inch water pressure above and below atmospheric.

With the above and other objects and features in view, the invention consists in the improved method and apparatus for checking ignition timing of an automotive engine which is hereinafter described and more particularly defined in the accompanying claims.

In the following description of the invention, reference may be had to the accompanying drawing in which:

Fig. 1 is a view in front elevation, with parts in section, showing a preferred type of instrument for use in locating the top dead center position of the engine.

Fig. 2 is a side view in vertical section of the instrument shown in Fig. 1, taken along the plane 2—2 of Fig. 1.

Fig. 3 is a view in front elevation of the same instrument illustrated in Figs. 1 and 2.

The preferred method of checking ignition timing according to the present invention contemplates positioning a precision cranker or rollator under a rear drive wheel of the automobile under test. By employing a precision cranker the operator can easily and smoothly hand-crank the engine forward and backward to the precise top dead center position of the piston on compression stroke. To inform the operator when the piston has reached top dead center position on compression stroke, the invention contemplates mounting a top dead center indicating pressure gauge 12 in operative communication with the ignition space of the engine cylinder under test and in full view of the operator as he turns the handle of the precision cranker. Gauge 12 is designed to show the operator when the piston has reached the top of its compression stroke within a limit of accuracy under one thousandth of an inch piston travel. A synchronizer or protractor has its radial arm and quadrant scale attached respectively to the timing shaft and housing of the distributor element of the ignition system after the cap and rotor of the distributor have been removed. After locating top dead center position of the piston the operator sets the radial arm or indicator needle of the synchronizer at zero position on the quadrant scale, graduated in engine crank angle degrees. The operator then advances the piston of the cylinder under test to a predetermined optimum fixed advance firing position for slow engine speed by using the precision cranker and the quadrant scale and indicator needle of the synchronizer. The interrupted points of the distributor are then checked and adjusted for firing a fuel charge in the cylinder with the piston in this position and the spark lever, if any, fully advanced. After adjusting the fixed spark advance of the cylinder under test the operator can start the engine and check and adjust the operation of the centrifugal governor controlling the automatic spark advance for various engine speeds, by means of a stroboscope lamp connected in the secondary ignition circuit, and oppositely disposed index marks respectively placed on the fan belt pulley and stationary engine casing to mark the fixed advance firing position of the cylinder under test, as hereinafter more fully explained.

Referring to Figs. 1 to 3 of the drawing, the top dead center gauge 12 is shown as comprising a special form of double U-tube manometer including upright legs in the form of gauge glasses 52 and 54, each communicably connected at their lower ends to a common liquid reservoir 56 comprising the central leg. A gauge liquid of about the same density as water but having a lower vapor pressure and lower surface tension, such as standard S. T. 37 hexylresorcinol solution, is preferably employed in gauge 12. Gauge glass 52 and reservoir 56 have their upper ends connected by passage 57 and ported to atmosphere through passage 58 in the gauge housing. The top of gauge glass 54 is ported out through a passage 60 into a sealed pressure chamber 62 which in turn is communicably connected to manifold 64 by a removable apertured orifice member 66 having an orifice of very small, almost capillary size. It will be noted that vertically mounted tubes 59 and 67 serve respectively as the inlet end of the connection between the top of reservoir leg 56 and passage 58, and as the inlet end of the connection between manifold 64 and pressure chamber 62 within which orifice 66 is mounted. Tubes 59 and 67 serve to space the said inlets respectively from the roof of the reservoir leg and from the floor of the pressure chamber a sufficient distance to substantially insure against loss of gauge liquid by blow-out or spilling. Ported out from manifold 64 is a lateral pressure relief passage 68 having an outlet to atmosphere which is normally closed against out-flow of air or gas by a ball valve 70 preferably weighted to hold its seat except when pressure in manifold 64 exceeds 5" water pressure. A pressure of 3" of water is normally sufficient to hold valve 70 open after it has left its seat under a 5" water pressure. A lateral vacuum relief passage 71 opens from atmosphere into manifold 64, passage 71 being normally closed against inflow of air from atmosphere to the manifold by a ball valve 72 which is preferably weighted to hold its seat except when there is a vacuum in the manifold exceeding —1" of water pressure. On a stem 74 attached to pressure relief valve 70 there is mounted a colored signal disk 76 which is lifted into the field of vision of a small peephole 78 cut in the front panel or gauge 12, whenever the valve 70 is raised off its seat. The gauge 12 is shown as operatively connected to the combustion chamber of No. 1 cylinder of the automobile engine under test through an elbow fitting 80 having a filter screen attachment at the inlet end of manifold 64, together with a flexible tube and coupling element 82 and an adapter fitting 84 threadably engaging the spark plug opening in the cylinder head.

To locate top dead center position of an engine piston, the operator removes a spark plug from its socket and connects the dead center gauge 12 to the clearance or ignition space of No. 1 cylinder for example. By means of the hand crank the piston is moved upwardly on a compression stroke, and sufficient pressure is developed ahead of the piston and in gauge manifold 64 to lift valve 70 off its seat and at the same time to depress the level of liquid in glass 54 and slightly raise the level of liquid in gauge glass 52. The cross sectional area of reservoir 56 is relatively large as compared to the area of legs 52 and 54, so that application of pressure or vacuum to the liquid in leg 54 causes a proportionately magnified change in liquid level in leg 54 without effecting any substantial change in the level of liquid in leg 52 and reservoir 56. Movement of a 3" piston at normal cranking rate as much as one thousandth of an inch away from its top dead center position has been found to shift the comparative levels of gauge liquid in glasses 54 and 52 almost 1". The operator turning the crank is apprised of the fact that the engine is on its compression stroke through observing the drop in level of liquid in gauge glass 54, and the signal disk 76 raised in the line of vision of peephole 78.

As the piston approaches its top dead center position on the compression stroke, its speed decreases, and the rate of flow of air out of the engine cylinder into gauge 12 therefore diminishes.

Valve 70 may therefore close at a point in the piston travel slightly before top dead center of compression because leakage of air occurs from the ignition space of the cylinder past the piston at a sufficient rate so that the operator finds that turning the piston a very few degrees past top dead center brings the liquid in gauge glass 54 to or above the level of liquid in glass 52. By cranking the engine in reverse direction two or three times a few degrees on either side of the top dead center, the operator quickly locates the piston at the exact top dead center of compression stroke by reason of the fact that leakage of air from the space above the cylinder results in quickly bringing the gauge liquid in legs 52 and 54 to the same level with the piston at top dead center of compression stroke.

By employing the method and apparatus of the present invention, it is possible for even an unskilled operator to effect a full, accurate and relatively rapid adjustment of the various elements concerned with the correct timing of the ignition circuit or circuits of an automotive internal combustion engine. The precision cranker can be operatively connected to the automotive engine ready for the test in the time required to throw the engine in gear and to drive the automobile onto the roller cradle. The precision cranker is adapted for use with all types of cars and is designed for use by an operator standing on either side of the car engine. The top dead center gauge is extremely simple in design and operation and requires no accessory parts other than adaptors to fit various sizes of spark plug openings. This gauge can be attached to the engine cylinder ready for test in the time required to remove the spark plug and insert the adaptor, and even an unskilled operator can very quickly turn the engine over by the precision cranker to the top dead center position of a piston on the compression stroke. The precision cranker and the top dead center gauge are designed so that the operator can stand in one position while locating the top dead center position of the piston and while checking the timing of the fixed spark advance and of the automatic spark advance by means of the synchronizer and by means of the stroboscopic lamp.

The invention having been thus described, what is claimed as new is:

1. Apparatus adapted for use in locating the top dead center position of a piston of an automobile engine comprising, a manometer filled with a liquid of low surface tension characteristics such as S. T. 37 resorcinol solution and having an open reservoir leg of relatively large cross section connected at its base with the lower ends of a pair of respectively high and low pressure measuring legs of relatively small cross section, a relief passage communicably connecting the upper end of the low pressure measuring leg with atmosphere, a manifold, a conduit and calibrated orifice communicably connecting the manifold with the upper end of the high pressure measuring leg, a pressure relief passage ported out of the manifold and controlled by a pressure relief valve, a vacuum relief passage ported out of the manifold and controlled by a vacuum relief valve, and a tubular connection including an adapter fitting for communicably connecting the manifold with the ignition space of a cylinder of said engine.

2. A gauge adapted for use in locating top dead center position of a piston in an internal combustion engine comprising, a double U-shaped manometer having a reservoir leg of relatively large cross section communicably connected at its base with the lower ends of each of a pair of upright high and low pressure measuring legs of relatively small cross section, a passage communicably connecting the upper end of the low pressure measuring leg and the reservoir leg, a relief passage communicably connecting the top of the reservoir leg with atmosphere, a pressure chamber and passage communicably connecting same with the upper end of the high pressure measuring leg, a manifold, a conduit and calibrated orifice communicably connecting the manifold with the pressure chamber, a pressure relief passage ported out of the manifold and controlled by a weighted pressure relief valve, and a vacuum relief passage ported out of the manifold and controlled by a weighted vacuum relief valve.

3. A gauge adapted for use in locating top dead center position of a piston in an internal combustion engine comprising, a double U-shaped manometer having a reservoir leg of relatively large cross section communicably connected at its base with the lower ends of each of a pair of upright high and low pressure measuring legs of relatively small cross section, a passage communicably connecting the upper end of the low pressure measuring leg and the reservoir leg, a relief passage communicably connecting the top of the reservoir leg with atmosphere, a pressure chamber and passage communicably connecting same with the upper end of the high pressure measuring leg, a manifold, a conduit and calibrated orifice communicably connecting the manifold with the pressure chamber, a pair of vertically mounted tubular members forming respectively the inlet end of the relief passage in the reservoir leg and the inlet end of the said conduit in the pressure chamber whereby said inlets are spaced respectively from the roof of the reservoir leg and from the floor of the pressure chamber, a pressure relief passage ported out of the manifold and controlled by a weighted pressure relief valve, and a vacuum relief passage ported out of the manifold and controlled by a weighted vacuum relief valve.

4. A gauge adapted for use in locating top dead center position of a piston in an internal combustion engine comprising, a double U-shaped manometer having a reservoir leg of relatively large cross section communicably connected at its base with the lower ends of each of a pair of upright high and low pressure measuring legs of relatively small cross section, a passage communicably connecting the upper end of the low pressure measuring leg and the reservoir leg, a relief passage communicably connecting the top of the reservoir leg with atmosphere, a pressure chamber and passage communicably connecting same with the upper end of the high pressure measuring leg, a manifold, a conduit and calibrated orifice communicably connecting the manifold with the pressure chamber, a pressure relief passage ported out of the manifold, a relief valve weighted to hold a back pressure of about 3" of water seated in controlling position within said pressure relief passage, a vacuum relief passage ported out of the manifold and controlled by a weighted vacuum relief valve, and a signalling device operatively associated with the pressure relief valve.

JOHN D. MORGAN.